United States Patent [19]

Kudo et al.

[11] Patent Number: 5,635,310
[45] Date of Patent: Jun. 3, 1997

[54] ZNS DIELECTRIC THIN FILM AND MAGNETIC RECORDING MEDIUM

[75] Inventors: Toshio Kudo; Kunio Ichiji, both of Tokyo; Hiroyasu Jobetto, Hachioji, all of Japan

[73] Assignee: Casio Computer Co., Ltd., Tokyo, Japan

[21] Appl. No.: 296,872

[22] Filed: Aug. 26, 1994

Related U.S. Application Data

[63] Continuation of Ser. No. 599,287, Oct. 17, 1990, abandoned.

[30] Foreign Application Priority Data

| | | | |
|---|---|---|---|
| Oct. 20, 1989 | [JP] | Japan | 1-271529 |
| Oct. 20, 1989 | [JP] | Japan | 1-271530 |
| Oct. 23, 1989 | [JP] | Japan | 1-275734 |
| Oct. 23, 1989 | [JP] | Japan | 1-275735 |

[51] Int. Cl.$^6$ .............. C09D 1/00; G11B 5/66; G11B 5/70
[52] U.S. Cl. .............. 428/694 TS; 106/286.6; 106/287.3; 106/287.32; 428/694 ST; 428/694 T; 428/694 TP; 428/694 ML; 428/900
[58] Field of Search .............. 428/694 ST, 694 T, 428/694 TS, 900, 694 TP, 694 ML; 106/286.6, 287.3, 287.32

[56] References Cited

U.S. PATENT DOCUMENTS

| | | | |
|---|---|---|---|
| 4,680,742 | 7/1987 | Yamada et al. | 369/13 |
| 4,847,132 | 7/1989 | Takao et al. | 428/698 |
| 4,861,671 | 8/1989 | Muchnik et al. | 428/694 DE |

FOREIGN PATENT DOCUMENTS

| | | |
|---|---|---|
| 293542 | 12/1987 | Japan . |
| 084453 | 3/1989 | Japan . |

OTHER PUBLICATIONS

Kunio Ichiji and Toshio Kudo, "Optical Properties of ZnS Films Prepared by RF Sputtering in Ar $+N_2$ Mixed Gases," *Shinkuh (Vacuum)*, vol. 33, No. 3 (1990), 191–193 (103–105).

T. Kudo, H. Johbetto and K. Ichiji, "Effect of Nitrogen Upon Enhancement of the Magnetic Kerr Rotation in ZnS(O,N)/TbFeCo Bilayer Films," *J. Appl. Phys.*, 67 (9), May 1, 1990, 4778–4780.

R. Allen and G.A.N. Connell, "Magneto–Optic Properties of Amorphous Terbium–Iron," *J. Appl. Phys.*, 53 (3) Mar. 1982, 2353–2355.

B.R. Critchley and P.R.C. Stevens, "Composition of RF–Sputtered ZnS Films," *J. Phys. Appl. Phys.*, vol. 11, 1978, 491–498.

Fujio Tanaka, Yasuyuki Nagao and Nobutake Imamura, "Dynamic Read/Write Characteristics of Magneto–Optical TbFeCo and DyFeCo Disk," *IEEE Transactions on Magnetics*, vol. MAG–20, No. 5, Sep. 1984, 1033–1035.

*Primary Examiner*—Paul J. Thibodeau
*Assistant Examiner*—Stephen Sand
*Attorney, Agent, or Firm*—Frishauf, Holtz, Goodman, Langer & Chick, P.C.

[57] ABSTRACT

A zinc sulfide thin film containing oxygen or oxygen and nitrogen has a high refractive index, a high transmittance, and a high Kerr rotation angle enhancing performance. The zinc sulfide thin film is manufactured by sputtering a zinc sulfide sintered product containing oxygen in an argon gas atmosphere or a gas mixture atmosphere of argon gas and nitrogen gas.

18 Claims, 14 Drawing Sheets

ZNS DIELECTRIC THIN FILM AND MAGNETIC RECORDING MEDIUM

This application is a continuation of application Ser. No. 07/599,287, filed Oct. 17, 1990, and now abandoned.

BACKGROUND OF THE INVENTION

1. Field of the Invention

The present invention relates to a dielectric thin film having excellent optical characteristics such as a refractive index and a transmittance and, more particularly, to a zinc sulfide thin film having improved optical characteristics and a method of manufacturing the same.

2. Description of the Related Art

Zinc sulfide (ZnS) is known as a material having a high transmittance and a high refractive index, and a thin film consisting of ZnS is used as, e.g., an anti-reflection film, a wide-band mirror, a waveguide, a micro lens, and a Kerr rotation angle enhancing film.

A conventional ZnS thin film consists of only zinc (Zn) and sulfur (S) at a composition ratio of 1:1 and is formed by a vacuum evaporation method or a sputtering method. A refractive index of such a conventional ZnS thin film is reported to be as high as 2.30 to 2.35.

In the applications described above, however, as the refractive index is increased, the film thickness of the thin film or the number of thin films can be decreased, and a manufacturing cost can be decreased accordingly. Therefore, a demand has arisen for development of a dielectric thin film having a higher refractive index and a higher transmittance.

SUMMARY OF THE INVENTION

The present invention has been made in consideration of the above situation and has as its object to provide a dielectric thin film having excellent optical characteristics such as a refractive index and a transmittance and a method of manufacturing the same.

A dielectric thin film according to the present invention is a zinc sulfide-based dielectric thin film containing Zn, S, and O as its constituting elements.

This dielectric thin film may further contain N as a constituting element.

A method of manufacturing the dielectric thin film according to the present invention comprises the steps of preparing a target containing Zn, S, and O and sputtering the target in an argon gas atmosphere. In order to manufacture a dielectric thin film additionally containing N, a gas mixture atmosphere of argon gas and nitrogen gas is used as the gas atmosphere to perform sputtering of the target.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The present invention will be described in detail below.

A dielectric thin film according to the present invention contains Zn, S, and O as its constituting elements. This dielectric thin film may further contain N. Such a dielectric thin film can have a higher refractive index and a higher transmittance than those of a conventional ZnS thin film. In particular, a dielectric thin film containing ZnS as its basic component, 4 to 10 at % of O, and 7 at % or less of N has a high refractive index. Among such films, a dielectric thin film additionally containing a small amount of N has a high refractive index with respect to light having a wavelength of 633 mm than that of a diamond which has a highest refractive index of high-transmittance materials. In addition, a dielectric thin film containing ZnS as its basic component and 10 to 30 at % of O has a high transmittance in not only a visible light region but also an ultraviolet region.

For this reason, such a dielectric thin film is expected to be applied to a member required to have a high transmittance and a high refractive index such as an anti-reflection film, a wide-band mirror, a waveguide, a micro lens, and an enhancing film for enhancing a Kerr rotation angle of a magnetic thin film.

The refractive index of this dielectric thin film largely depends on its composition, e.g., a content of N and therefore can be changed throughout a wide range by adjusting the composition. Therefore, the following films of (1) to (3) can be easily obtained:

(1) A multi-layered film formed by stacking thin films one after another which have different refractive index from each other.

(2) A multi-layered film formed by stacking thin films so that the refractive index is increased or decreased in order.

(3) A thin film in which the refractive index changes successively along the direction perpendicular to the film surface.

In addition, by adjusting the composition of the dielectric thin film, especially the content of N and a ratio between Zn and S, the structure of the thin film may be either a polycrystalline state or an amorphous state. When the thin film is polycrystalline, especially a refractive index can be increased. When the thin film is amorphous, especially a transmittance can be increased. In this case, an effect of increasing a transmittance can be significantly obtained in a short-wavelength region.

Furthermore, by adjusting the content of N of the dielectric thin film, a wavelength position of an absorption edge can be changed.

Figure 1:
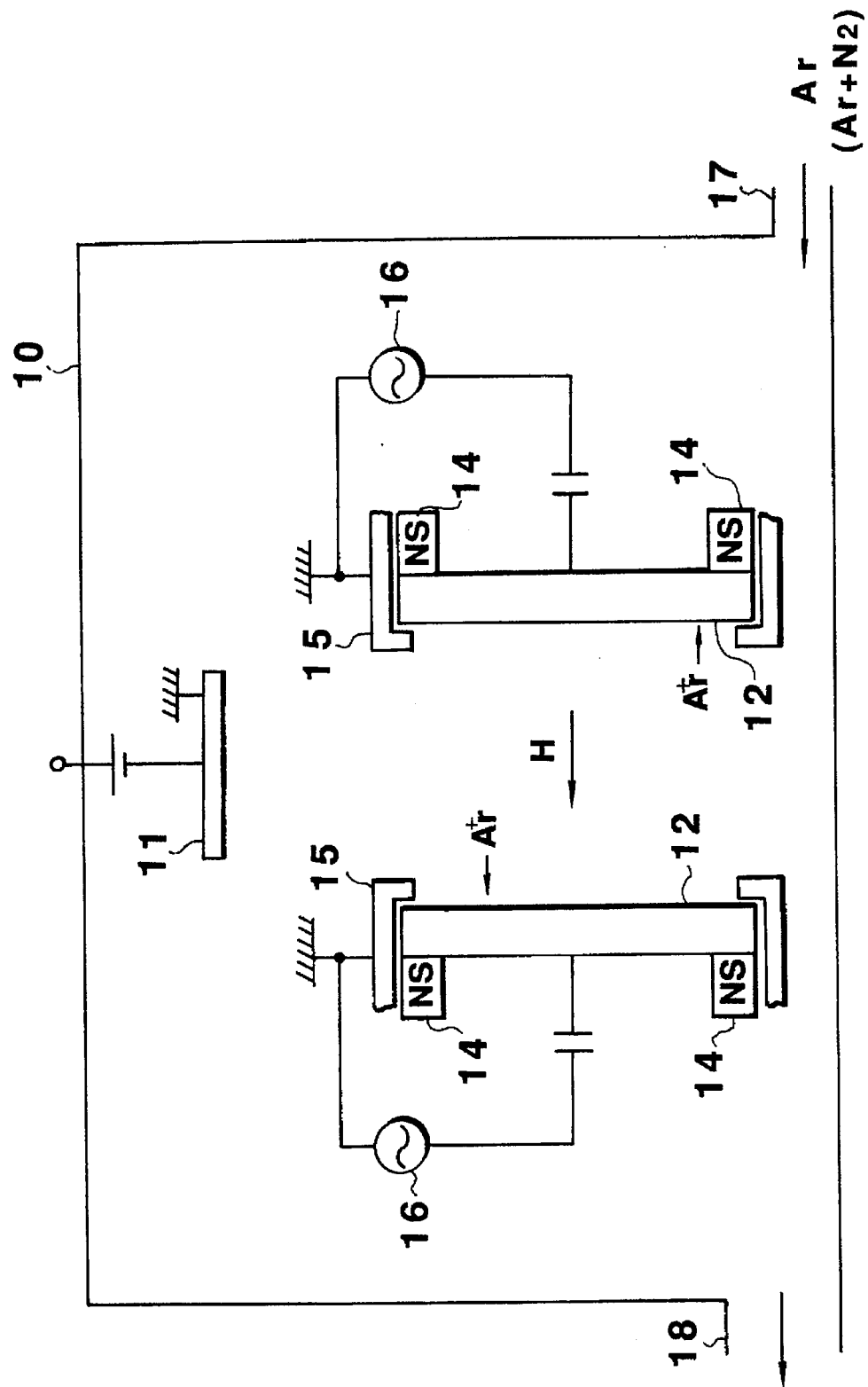
FIG. 1 is a schematic view showing a sputtering apparatus for manufacturing a dielectric thin film according to the present invention.
Figure 2A:
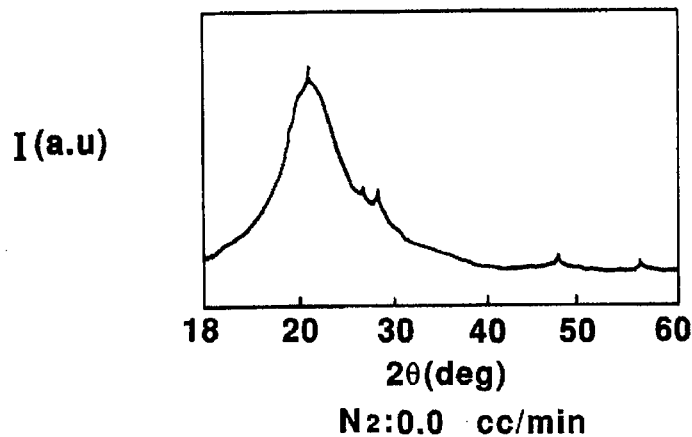
FIGS. 2A to 2F are graphs showing X-ray diffraction patterns of thin film samples obtained when the flow rates of $N_2$ gas supplied upon sputtering are 0.0 cc/min, 0.3 cc/min, 1.0 cc/min, 3.0 cc/min, 8.0 cc/min, and 20.0 cc/min, respectively.
Figure 2B:
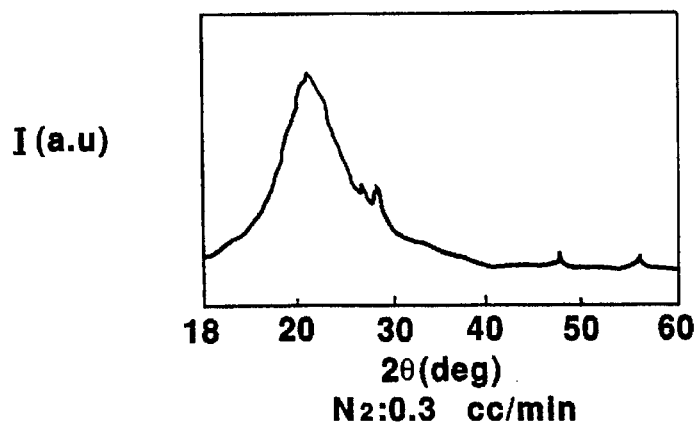
Figure 2C:
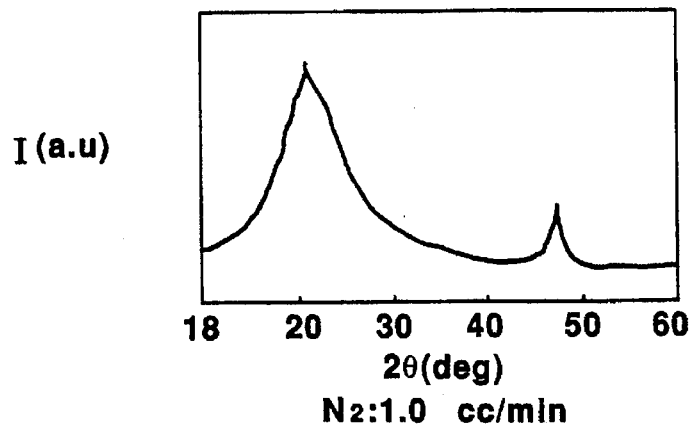
Figure 2D:
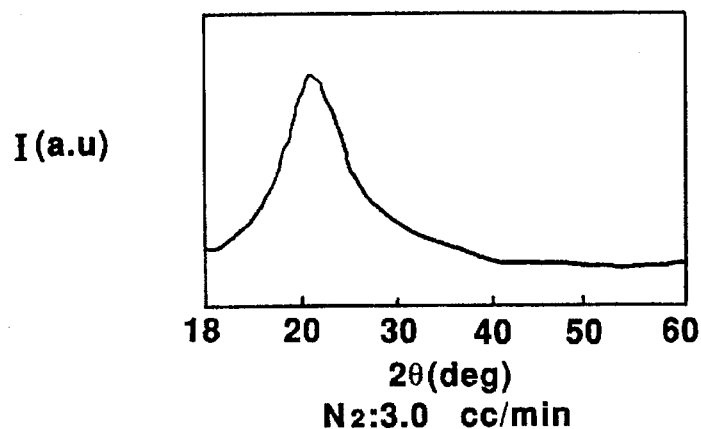
Figure 2E:
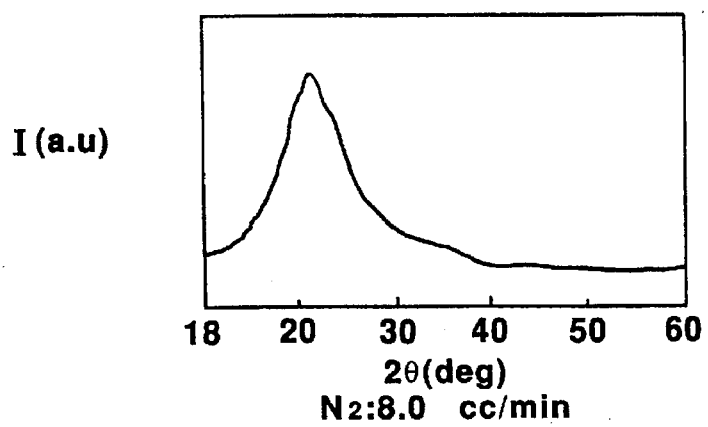
Figure 2F:
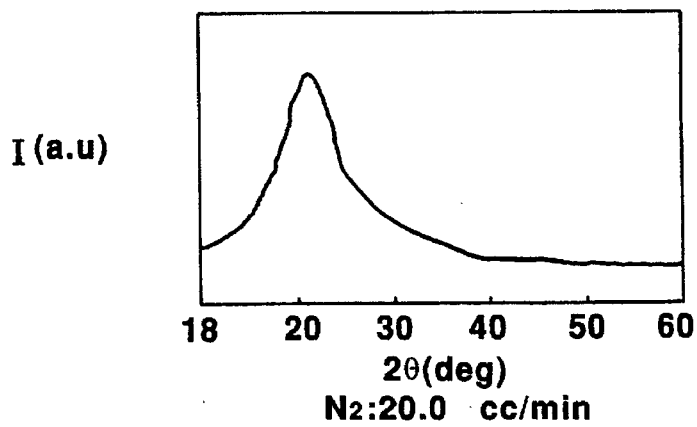
Figure 3A:
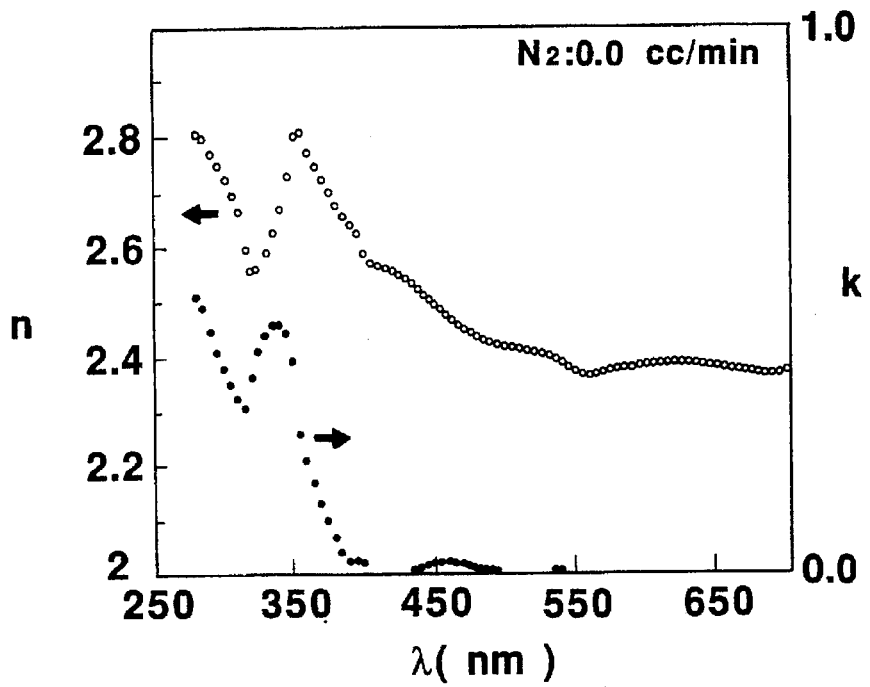
FIGS. 3A to 3D are graphs showing optical-constant spectra of thin film samples obtained when the flow rates of $N_2$ gas supplied upon sputtering are 0.0 cc/min, 0.3 cc/min, 3.0 cc/min, and 20.0 cc/min, respectively.
Figure 3B:
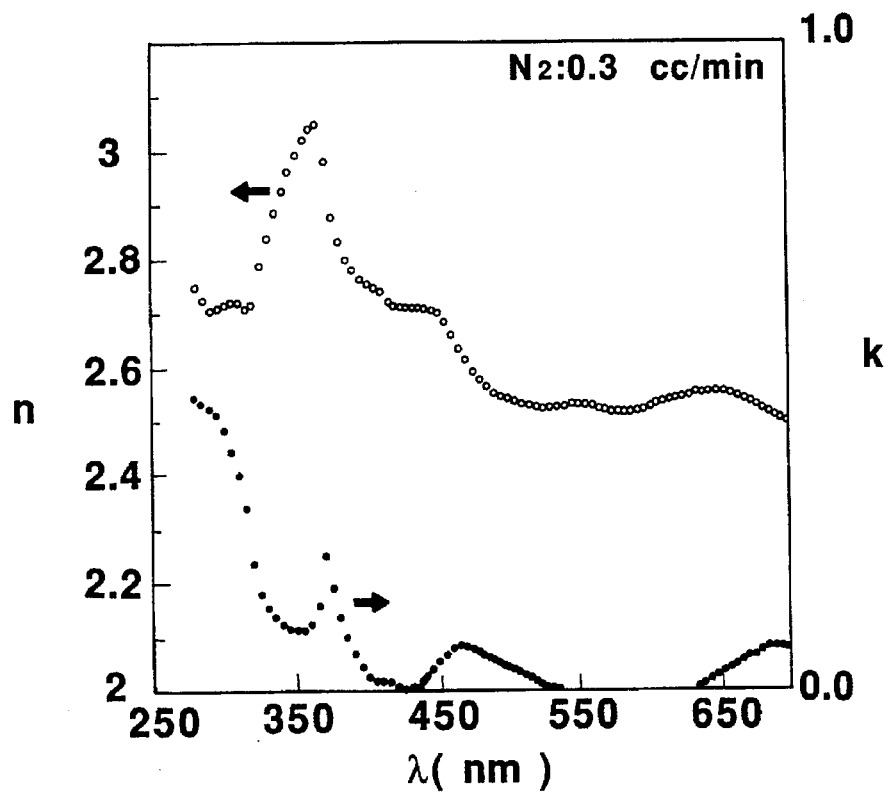
Figure 3C:
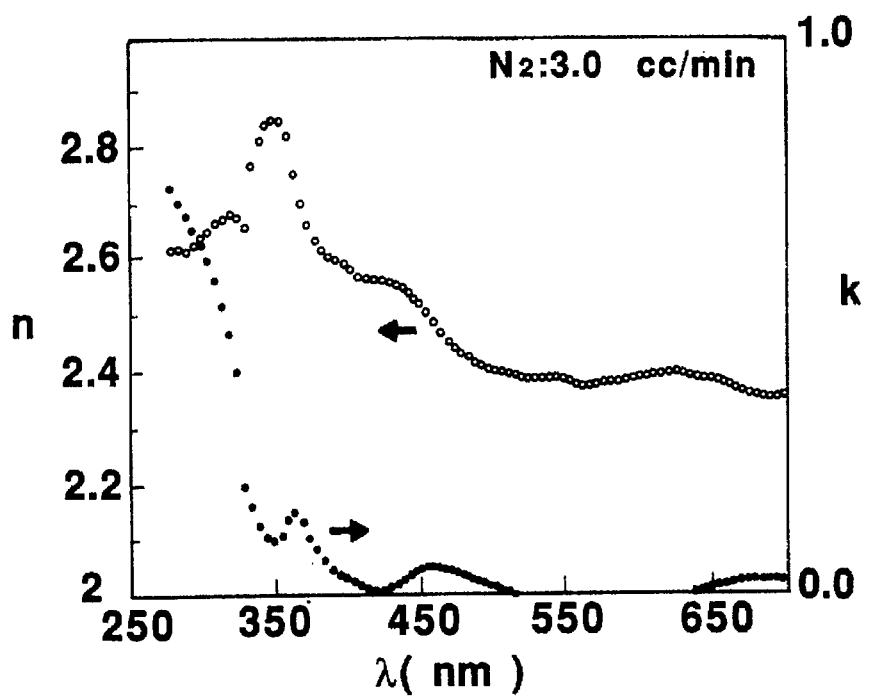
Figure 3D:
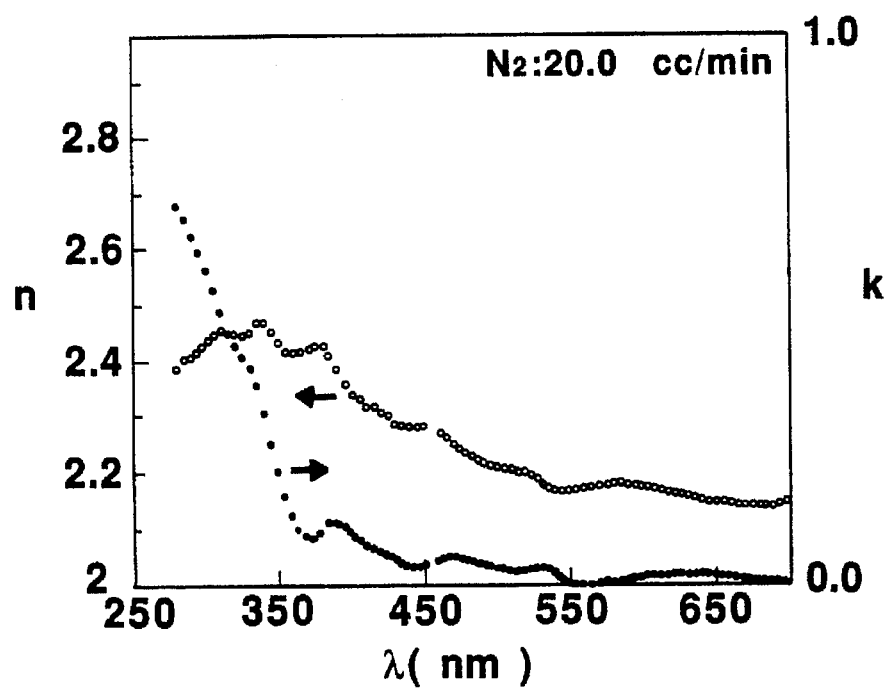

A method of manufacturing the dielectric thin film as described above will be described below. FIG. 1 is a schematic view showing an arrangement of an apparatus for manufacturing a dielectric thin film according to the present invention, i.e., an opposed-targets r.f. sputtering apparatus. Referring to FIG. 1, a pair of targets 12 each consisting of a ZnS sintered product are arranged in a chamber 10. Note that the ZnS sintered target contains a small amount of oxygen (O).

A substrate 11 is rotatably supported by a rotary support member (not shown) above the targets 12. A magnet 14 is arranged on the entire peripheral portion on the rear surface of each target 12, and a magnetic field H is present between the targets. An AC power supply 16 is connected to each target 12 to supply power to the target 12. The circumferential portion of each target 12 is covered with a cylindrical target cover 15.

A gas supply port 17 and a gas exhaust port 18 are formed in the chamber 10. An argon (Ar) gas supply source and an nitrogen ($N_2$) gas supply source (neither is shown) are connected to the gas supply port 17 and supply Ar gas or a mixed gas of Ar gas and $N_2$ gas into the chamber 10. A vacuum pump (not shown) is connected to the gas exhaust port 18 and activated to obtain a predetermined gas pressure in the chamber 10.

In order to form a thin film formed of Zn, S, and O by using the sputtering apparatus having the above arrangement, while Ar gas is supplied into the chamber 10, the vacuum pump is activated to generate an Ar gas atmosphere at a predetermined reduced pressure in the chamber 10, and power is supplied to the ZnS sintered targets 12 in this Ar gas atmosphere to perform sputtering. In order to form a thin film formed of Zn, S, O, and N, while a mixed gas of Ar gas and $N_2$ gas is supplied into the chamber 10, the vacuum pump is activated to generate a gas mixture atmosphere at a predetermined reduced pressure in the chamber 10, and power is supplied to the ZnS sintered targets 12 in this mixed gas atmosphere to perform reactive sputtering. In this sputtering apparatus, since the magnets 14 apply a magnetic field perpendicularly to the target surfaces upon sputtering, a generation rate of Ar ions ($Ar^+$) is increased by this magnetic field to increase a sputtering rate.

Upon sputtering, sputter grains liberated from the targets 12 are deposited on the substrate 11 separated from a plasma, thereby forming a thin film thereon. In this case, since a small amount of O is present in the ZnS sintered targets, a small amount of O is contained in the thin film. When a mixed gas of Ar gas and $N_2$ gas is supplied into the chamber 10, N in the chamber 10 is also contained in the thin film. As a result, a thin film consisting essentially of Zn, S, and O or Zn, S, O, and N is formed on the substrate. In this case, since the substrate 11 is separated from a plasma, it is held at a temperature close to room temperature. In addition, since an apparatus for forming the thin film is an opposed-targets r.f. sputtering apparatus, a thin film composition can be easily controlled.

Figure 5:
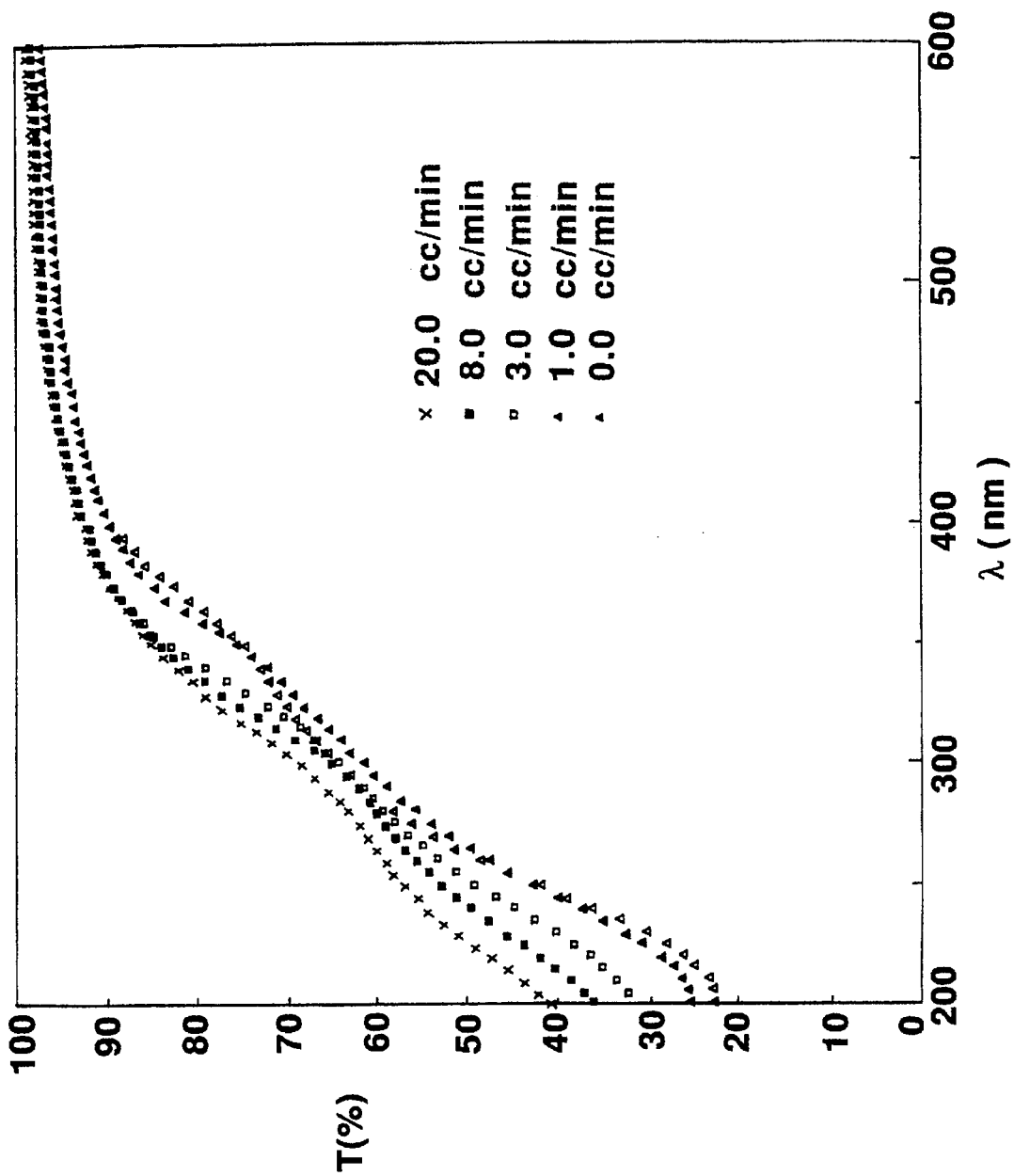
FIG. 5 is a graph showing a relationship between a wavelength of radiated light and a transmittance of each of thin film samples obtained at different flow rates of $N_2$ gas supplied upon sputtering.

The dielectric thin film consisting essentially of Zn, S, and O or Zn, S, O, and N manufactured as described above has optical characteristics superior to those of a conventional ZnS thin film. The transmittance of such a dielectric thin film, however, is decreased in a short-wavelength region. For example, as shown in FIG. 5 (to be described later), a transmittance of a test sample containing 7 to 8 at % of O is decreased from a wavelength of about 400 nm, and becomes about 50% at a wavelength of 250 nm. Therefore, in general, such a thin film sample cannot be used in a region having a wavelength of 400 nm or less.

The transmittance of the dielectric thin film consisting of Zn, S, O, and N can be increased by annealing. That is, when the dielectric thin film formed by sputtering and formed of Zn, S, O, and N is annealed, a transmittance is increased regardless of the wavelength of radiated light. In particular, a transmittance in a short-wavelength region can be significantly increased, and a transmittance in a visible light region becomes more uniform than that obtained before annealing. Therefore, this dielectric thin film can be suitably used in not only a visible light region but also an ultraviolet region.

Note that annealing can be performed in the air at a low temperature of about 150° C.

Various types of samples were manufactured on the basis of the method of the present invention, and their optical characteristics were measured. The measurement results will be described below.

By using the opposed-target r.f. sputtering apparatus shown in FIG. 1, ZnS sintered products (containing a small amount of O) were used as targets to perform sputtering, thereby manufacturing thin film samples. In the manufacture, while a flow rate of Ar gas to be supplied into the chamber was fixed at 27.0 cc/min, a flow rate of $N_2$ gas to be mixed in Ar gas was changed to 0.0 cc/min, 0.3 cc/min, 1.0 cc/min, 3.0 cc/min, 8.0 cc/min, and 20.0 cc/min, thereby manufacturing six types of samples (Examples 1 to 6 in the order of $N_2$ gas flow rates). A background pressure in the chamber 10 was $4\times10^{-7}$ Torr, and a gas pressure in the chamber during sputtering was $1.1\times10^{-3}$ Torr when the $N_2$ gas flow rate was 0.0 cc/min and $1.5\times10^{-3}$ Torr when the $N_2$ gas flow rate was 20.0 cc/min. Since the substrate was separated from a plasma during sputtering, the substrate temperature was increased by only several degrees from room temperature.

Elemental analysis, X-ray diffraction, and refractive index measurement to be described below were performed by using samples obtained by forming 260- to 430-nm thick films on 2-mm thick quartz glass substrates at a film deposition rate of 3.5 to 4.5 nm/min, and a transmittance was measured by using samples obtained by forming 18- to 35-nm thick films on 1-mm thick Pyrex non-alkali glass substrates at a film deposition rate of 0.4 nm/min or less.

When the compositions of the samples of Examples 1, 2, 4, and 6 were analyzed by electron spectroscopy for chemical analysis (ESCA), results as shown in Table 1 were obtained. Note that analysis values of a ZnS standard specimen (polycrystalline ZnS) are also listed in Table 1 as a reference.

TABLE 1

|  | N$_2$ gas flow rate | Component (at %) | | | |
|---|---|---|---|---|---|
|  | (cc/min.) | Zn | S | N | O |
| Example 1 | 0.0 | 47 | 46 | — | 7.2 |
| Example 2 | 0.3 | 46 | 46 | tr | 7.9 |
| Example 4 | 3.0 | 47 | 40 | 5.6 | 8.0 |
| Example 6 | 20.0 | 50 | 33 | 9.4 | 7.5 |
| Standard Specimen | — | 48 | 48 | — | 4.1 |

In Table 1, "tr" means that an element is assumed to exist from the measurement results of a refractive index and the like (to be described later) but could not be detected by the ESCA. As shown in Table 1, as the N$_2$ gas flow rate is increased, the N content in the thin film is increased, and a composition ratio (S/Zn) of S to Zn is decreased. When the N$_2$ gas flow rate was 20 cc/min, the N content was 9.4 at %, and S/Zn was 0.66. In addition, each thin film contains 7 to 8 at % of O.

FIGS. 2A to 2F are graphs showing X-ray diffraction patterns of the samples obtained by forming thin films by changing the N$_2$ gas flow rate as described above. Note that a high peak near a diffraction angle of 20° is based on the substrate. In the samples (FIGS. 2A and 2B) manufactured at the N$_2$ gas flow rates of 0.0 cc/min and 0.3 cc/min, a hexagonal crystal diffraction peak was found near a diffraction angle of 27°, and a hexagonal or cubic crystal diffraction peak was found near diffraction angles of 29°, 47.5°, and 56.5°. Therefore, a polycrystal consisting of a hexagonal crystal or a mixed phase of a hexagonal crystal and a cubic crystal is present in each thin film. In the sample (FIG. 2C) manufactured at the N$_2$ gas flow rate of 1.0 cc/min, a high diffraction peak was found near a diffraction angle of 47.5°. That is, a polycrystal is present in the thin film. This peak is assumed to indicate that a crystal face which is considered as a (220) face of a cubic crystal or a (110) face of a hexagonal crystal is preferentially oriented.

In the samples (FIGS. 2D to 2F) manufactured at the N$_2$ gas flow rates of 3.0 to 20.0 cc/min, no diffraction peak except for the diffraction peak based on the substrate was found, i.e., each thin film was in an amorphous state. That is, it was confirmed that the structure of thin film was either crystalline or amorphous states, according to the N$_2$ gas flow rate during sputtering. On the basis of these X-ray diffraction patterns and the thin film compositions, it was confirmed that when the thin film had a large N content and a small S/Zn ratio, the film tended to be amorphilized.

FIGS. 3A to 3D show optical-constant spectra obtained by measuring, by using a wavelength dispersion type ellipsometer, samples manufactured by changing the flow rate of N$_2$ gas to be mixed in Ar gas to be 0.0 cc/min, 0.3 cc/min, 3.0 cc/min, and 20.0 cc/min during sputtering.

Figure 4:
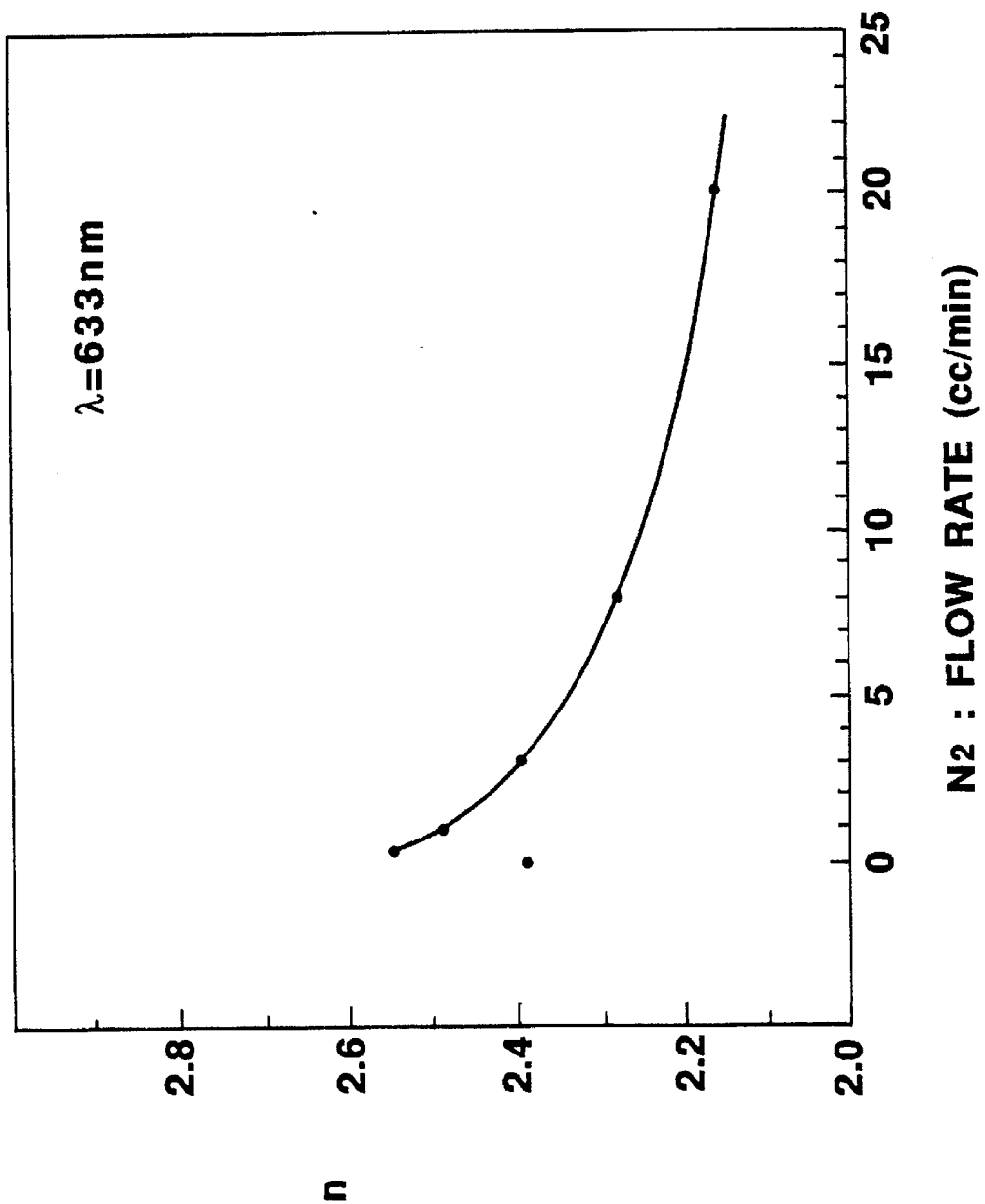
FIG. 4 is a graph showing a relationship between a flow rate of $N_2$ gas supplied upon sputtering and a refractive index.

FIG. 4 shows a relationship between a refractive index of each sample and an N$_2$ gas flow rate during thin film formation of the sample at a wavelength of 633 nm on the basis of the measured optical-constant spectra.

As is apparent from FIG. 4, a refractive index of each of four types of samples manufactured at N$_2$ gas flow rates of 3.0 cc/min or less is higher than a refractive index (2.30 to 2.35) of a conventional ZnS thin film. In particular, refractive indexes of samples manufactured at N$_2$ gas flow rates of 0.3 cc/min and 1.0 cc/min were 2.55 and 2.48, i.e., higher than refractive index n=2.41 ($\lambda$=633 nm) of a diamond having a highest refractive index of conventional high-transmittance materials.

FIG. 5 shows a relationship between the wavelength of radiated light and a transmittance for each N$_2$ gas flow rate during thin film formation. All of the samples had the same thickness, and the thickness of each sample was as thin as 12 nm so as to eliminate the interferent effect. As shown in FIG. 5, in each of the samples, a transmittance was decreased from a wavelength near 400 nm which was a wavelength of a visible light region toward the shorter wavelengths. It was confirmed, however, that the transmittance was increased as the N$_2$ gas flow rate was increased, and an absorption edge was shifted toward the shorter wavelengths to widen a wavelength region having a high transmittance toward the shorter wavelengths. That is, as the N$_2$ gas flow rate was increased, the transmittance, especially that in a short-wavelength region was increased.

The results obtained by annealing thin films manufactured by sputtering will be described below. The range of the thicknesses of the samples used was between 18 nm to 35 nm. Annealing was performed in dry air at 150° C. for 440 hours or less, and a transmittance of each of the annealed samples was measured.

As a result, in samples manufactured by not supplying N$_2$ gas, almost no change was found in transmittance even after annealing was performed. Of samples manufactured by supplying N$_2$ gas in those manufactured at N$_2$ gas flow rates of up to 1.0 cc/min, a transmittance was not much increased.

Figure 6:
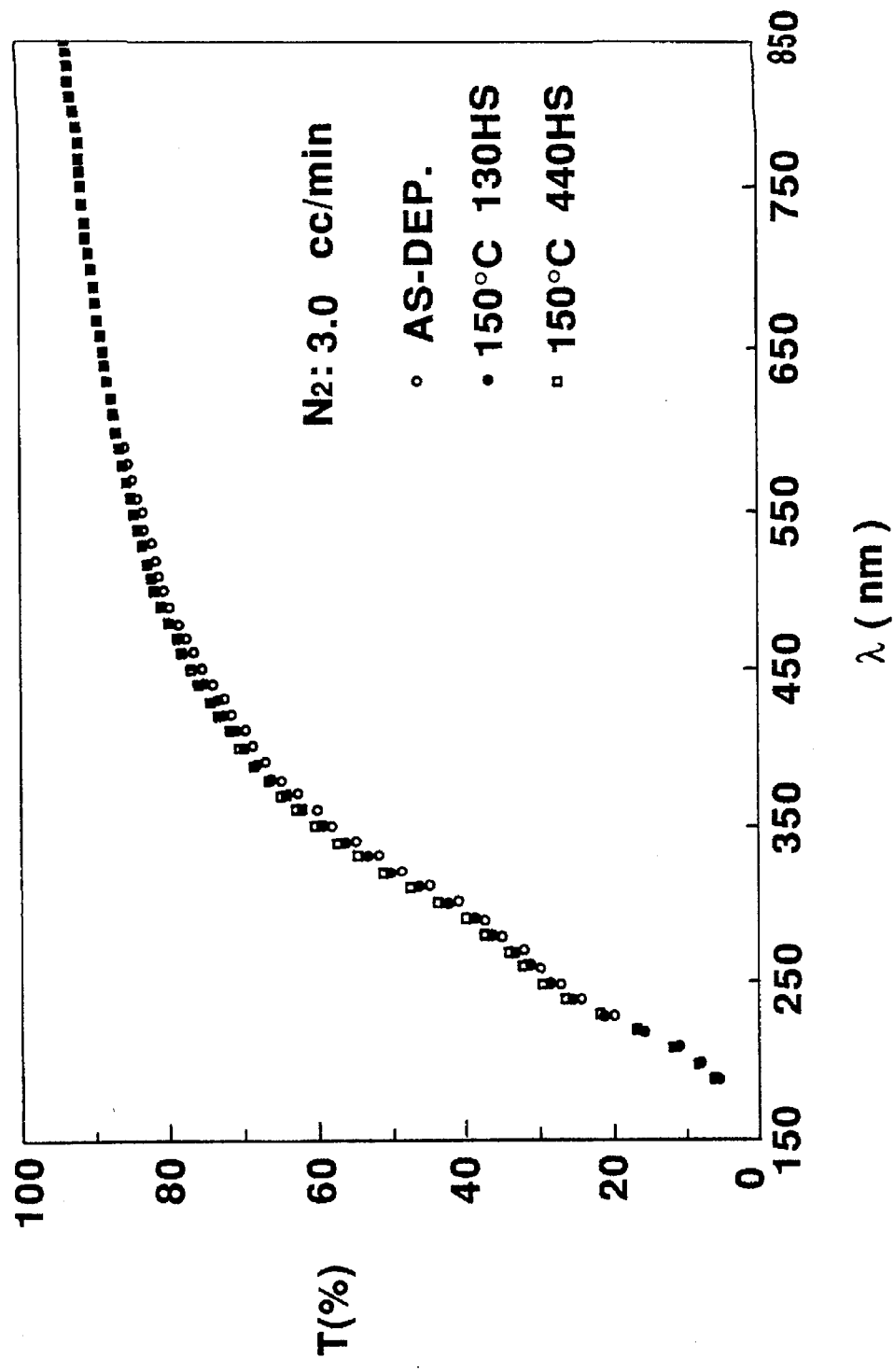
FIGS. 6 to 8 are graphs showing an influence of annealing on a transmittance of thin film samples obtained when flow rates of $N_2$ gas supplied upon sputtering are 3.0 cc/min, 8.0 cc/min, and 20.0 cc/min, respectively.
Figure 7:
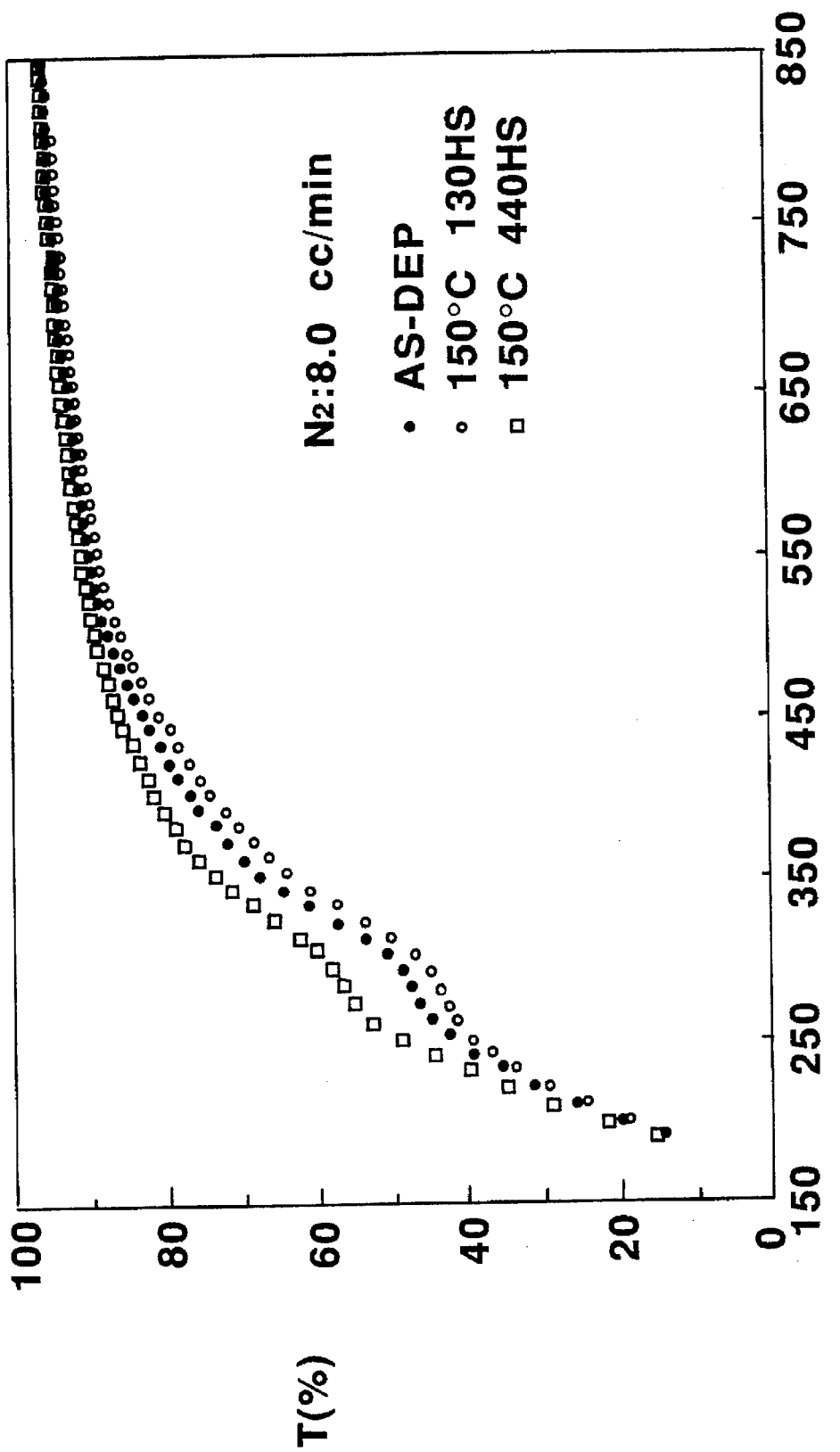
Figure 8:
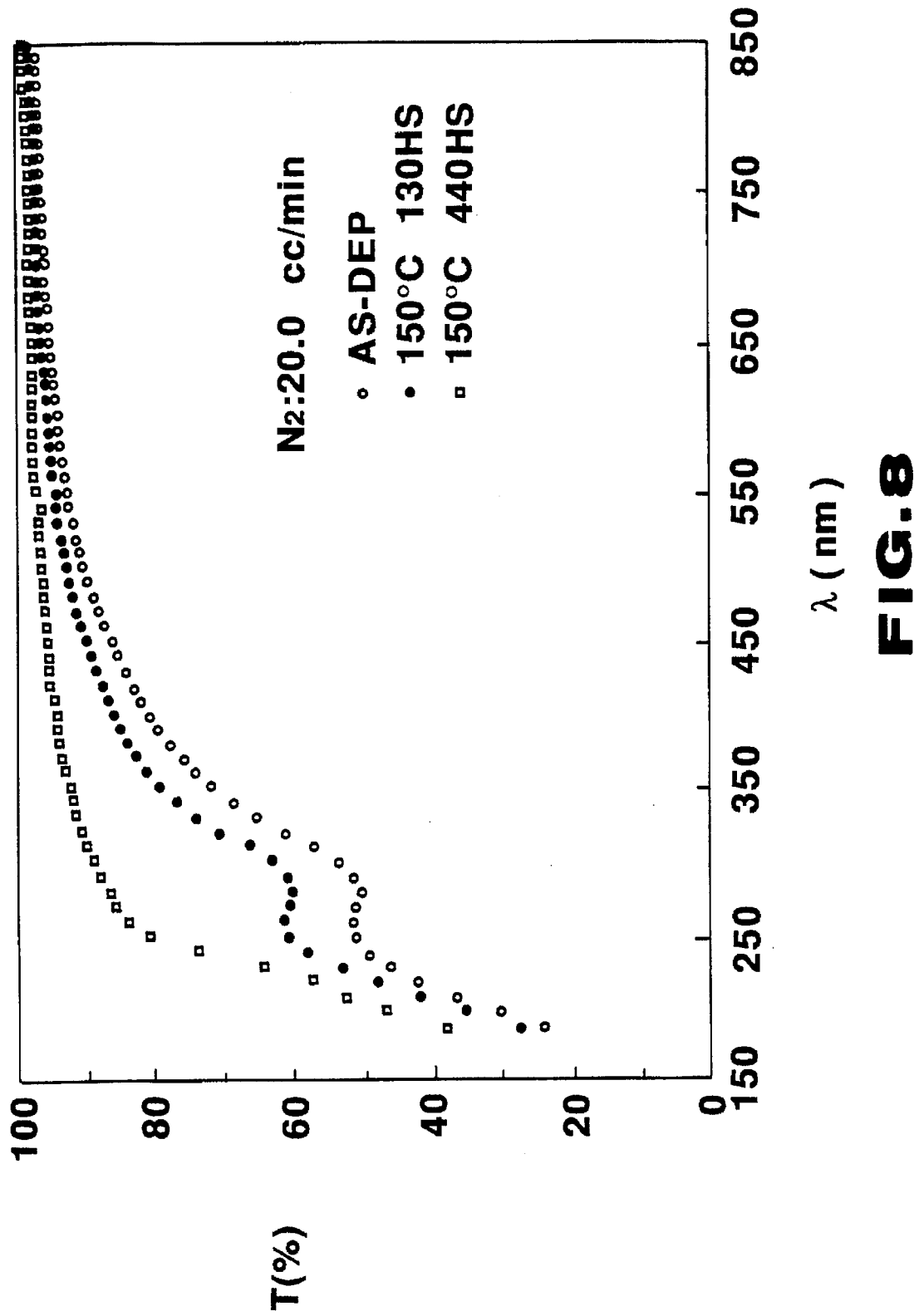

As shown in FIG. 6, in as-deposited samples manufactured at an N$_2$ gas flow rate of 3.0 cc/min, a slight increase was found in transmittance in a short-wavelength region having a radiated light wavelength of 570 to 250 nm. In addition, in samples manufactured at an N$_2$ gas flow rate of 8.0 cc/min, a clear increase was found in transmittance in the similar short-wavelength region, and it was confirmed that this effect was more significant in samples annealed for 440 hours than in samples annealed for 130 hours, as shown in FIG. 7. As shown in FIG. 8, in samples manufactured at an N$_2$ gas flow rate of 20.0 cc/min, a significant increase was found in transmittance. In particular, a high transmittance of 90% or more was obtained even in an ultraviolet region having a wavelength of about 300 nm in a sample annealed for 440 hours. Although not shown, it was confirmed that a change in transmittance caused by annealing was large up to an annealing time of 300 hours but was small from then on to 440 hours i.e., was saturated at about 300 hours.

Figure 9:
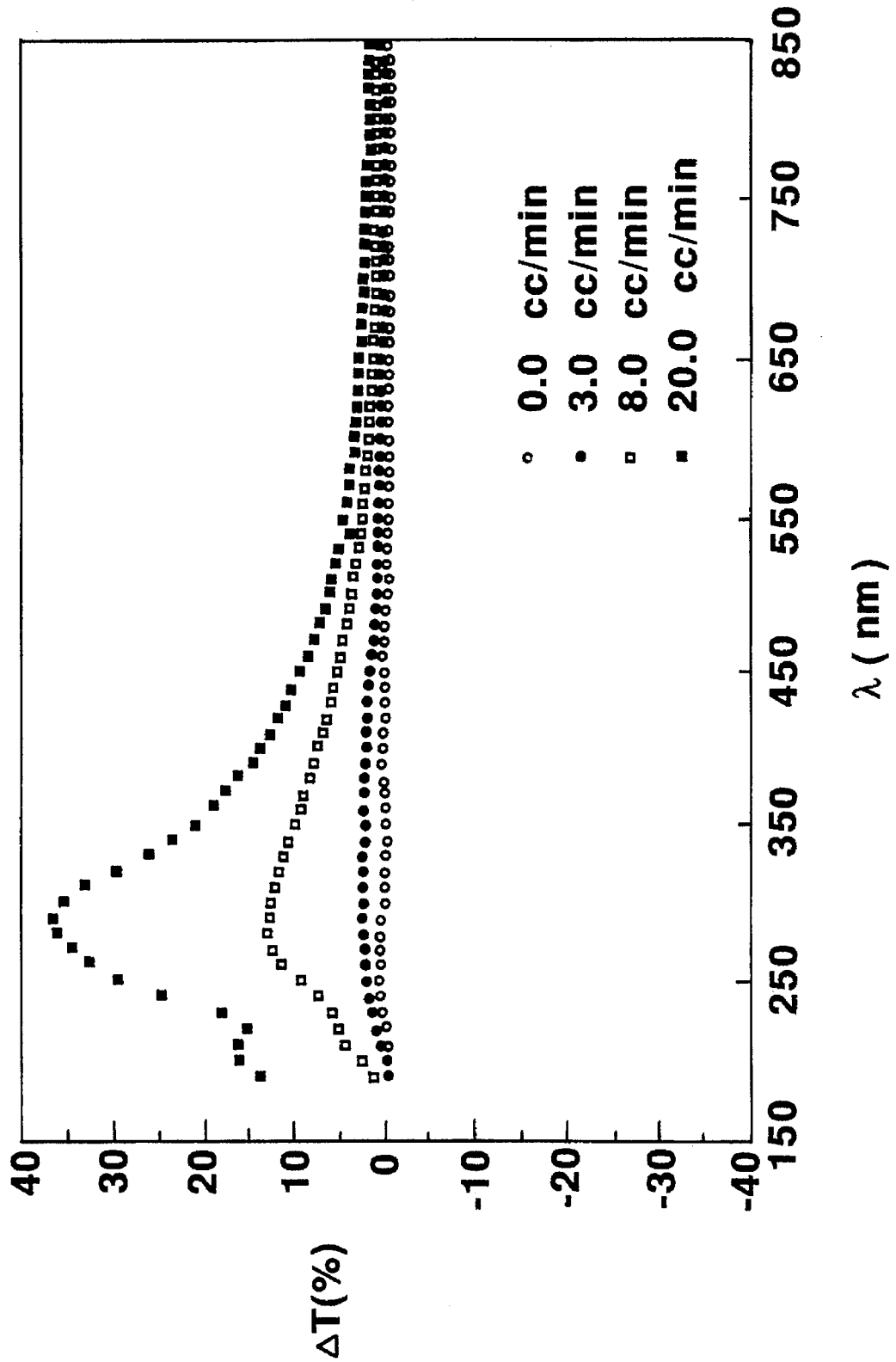
FIG. 9 is a graph showing a change in a transmittance caused by annealing in each thin film sample.

FIG. 9 shows an effect of annealing according to a wavelength of radiated light in samples manufactured at the respective N$_2$ gas flow rates. In FIG. 9, $\Delta T$ of the ordinate indicates a value obtained by subtracting a transmittance of an as-deposited sample from that of a sample annealed for 440 hours.

As shown in FIG. 9, a transmittance increasing the effect of annealing was found in samples manufactured at N$_2$ gas flow rates of 3.0 cc/min or more. In particular, the transmittance increasing effect was significant in an ultraviolet region having a short wavelength of 350 to 200 nm, and an increase amount of transmittance was increased as the N$_2$ flow rate was increased.

Analyzing the compositions of the samples by an auger, no composition change caused by annealing was found in samples manufactured at an N$_2$ gas flow rate of 0.0 cc/min. In samples manufactured at N$_2$ gas flow rates of 0.3 cc/min or more, however, an increase was found in content of oxygen. The increase in content of oxygen caused by annealing was increased as the N$_2$ gas flow rate for manufacturing the samples was increased. For example, in a sample manufactured at an N$_2$ gas flow rate of 20.0 cc/min, an oxygen content was about 10 at % in the state of as deposited, about 20 at % after annealing.

When the film quality after annealing of each of samples manufactured at $N_2$ gas flow rates of 20.0 cc/min was checked, it remained amorphous state.

A dielectric thin film of the present invention was formed on a magnetic thin film, and a Kerr rotation angle enhancing effect was measured. The measurement results will be described below.

Figure 10:
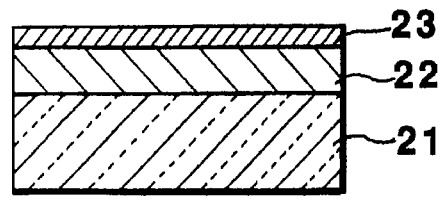
FIG. 10 is a sectional view showing an element arrangement for measuring a Kerr rotation angle enhancing effect.

FIG. 10 shows an element arrangement subjected to measurement of the Kerr rotation angle enhancing effect. Referring to FIG. 10, a substrate 21 is formed of 1-mm thick non-alkali glass (Pyrex substrate), and a magnetic thin film 22 is formed of a 165-nm thick TbFeCo alloy ($Tb_{24}Fe_{66}Co_{10}$). A dielectric thin film 23 of the present invention consisting of Zn, S, and O or Zn, S, O, and N is formed on the magnetic thin film 22. The magnetic thin film 22 and the dielectric thin film 23 were formed by using the opposed-target r.f. sputtering apparatus shown in FIG. 1. In this case, a pair of Tb-FeCo composite targets and a pair of ZnS sintered targets were arranged in the chamber 10. Note that the Tb-FeCo composite target is constituted by an $Fe_{90}Co_{10}$ alloy disk and Tb-chips plugged into the surface of the alloy disk. The ZnS sintered target is the same as the ZnS sintered target described above and contains oxygen.

First, sputtering is performed by using the Tb-FeCo alloy targets. In this case, while Ar gas is supplied into the chamber 10 at a flow rate of 27.0 cc/min, the vacuum pump is activated to obtain an Ar gas atmosphere at a pressure of $1.1 \times 10^{-3}$ Torr in the chamber 10 to perform sputtering for a predetermined time period. Sputter particles liberated from the Tb-FeCo alloy targets are adhered on the substrate 21 separated from a plasma and are rapidly cooled. In this manner, a 165 nm-thick magnetic thin film 22 consisting of an amorphous TbFeCo alloy ($Tb_{24}Fe_{66}Co_{10}$) is formed on the substrate 21.

After the magnetic thin film 22 is formed as described above, the rotary support member is rotated by 180° to locate the substrate 21 having the magnetic thin film 22 formed thereon above a portion between the pair of ZnS sintered targets, thereby preparing for sputtering of the ZnS sintered targets to be subsequently performed.

Thereafter, as in the formation of samples 1 to 6 described above, while Ar gas or a mixed gas of Ar gas and $N_2$ gas is supplied, the ZnS sintered targets are sputtered to form a dielectric thin film 23 consisting of Zn, S, and O or Zn, S, O, and N on the magnetic thin film 22.

In accordance with the above method, a flow rate of $N_2$ gas to be mixed in Ar gas during sputtering of the ZnS sintered targets was set at 0.0 cc/min, 0.3 cc/min, 3.0 cc/min, and 20.0 cc/min, and a plurality of samples were formed by changing a deposited film thickness from 18 to 900 nm at each flow rate. A Kerr rotation angle with respect to each wavelength was measured for each sample. Note that the Kerr rotation angle was measured by radiating light, in a magnetic field having a strength of 10 kOe and directed from the lower to upper surfaces of the dielectric thin film 23, at an angle of 10° with respect to the normal to the surface of the dielectric thin film 23.

Figure 11:
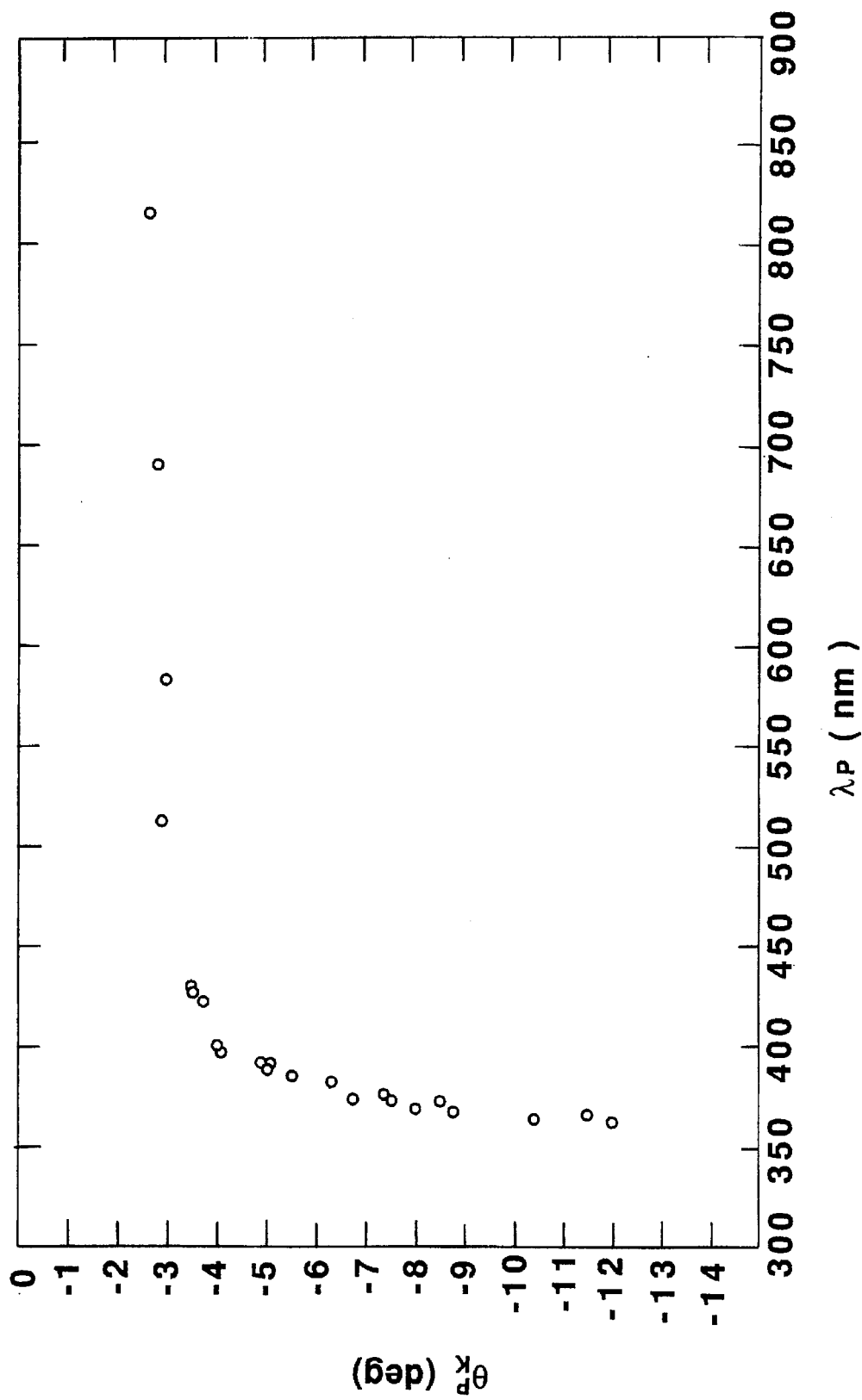
FIGS. 11 and 12 are graphs each showing a relationship between a maximum value of a Kerr rotation angle the wavelength of radiated light.

FIG. 11 shows a relationship between a maximum value ($\theta^p_k$) of the Kerr rotation angle in samples manufactured at an $N_2$ gas flow rate of 0.0 cc/min and the wavelength ($\lambda p$) of radiated light in which the abscissa indicates the wavelength of radiated light and the ordinate indicates the Kerr rotation angle.

As is apparent from FIG. 11, the dielectric thin film ($Zn_{47}S_{46}O_7$) of this embodiment exhibits a very large Kerr rotation angle of −12° with respect to light having a short wavelength of 363 nm. Also, this dielectric thin film exhibits a large Kerr rotation angle of −2.7° in a wavelength band (780 to 830 nm) of a semiconductor laser. This Kerr rotation angle is very large since a Kerr rotation angle obtained by a conventional single-layered dielectric thin film was about 1°.

This relationship between a maximum value of the Kerr rotation angle and the wavelength of radiated light is the same in samples manufactured at $N_2$ gas flow rates of 0.3 cc/min, 3.0 cc/min, and 20.0 cc/min.

Figure 12:
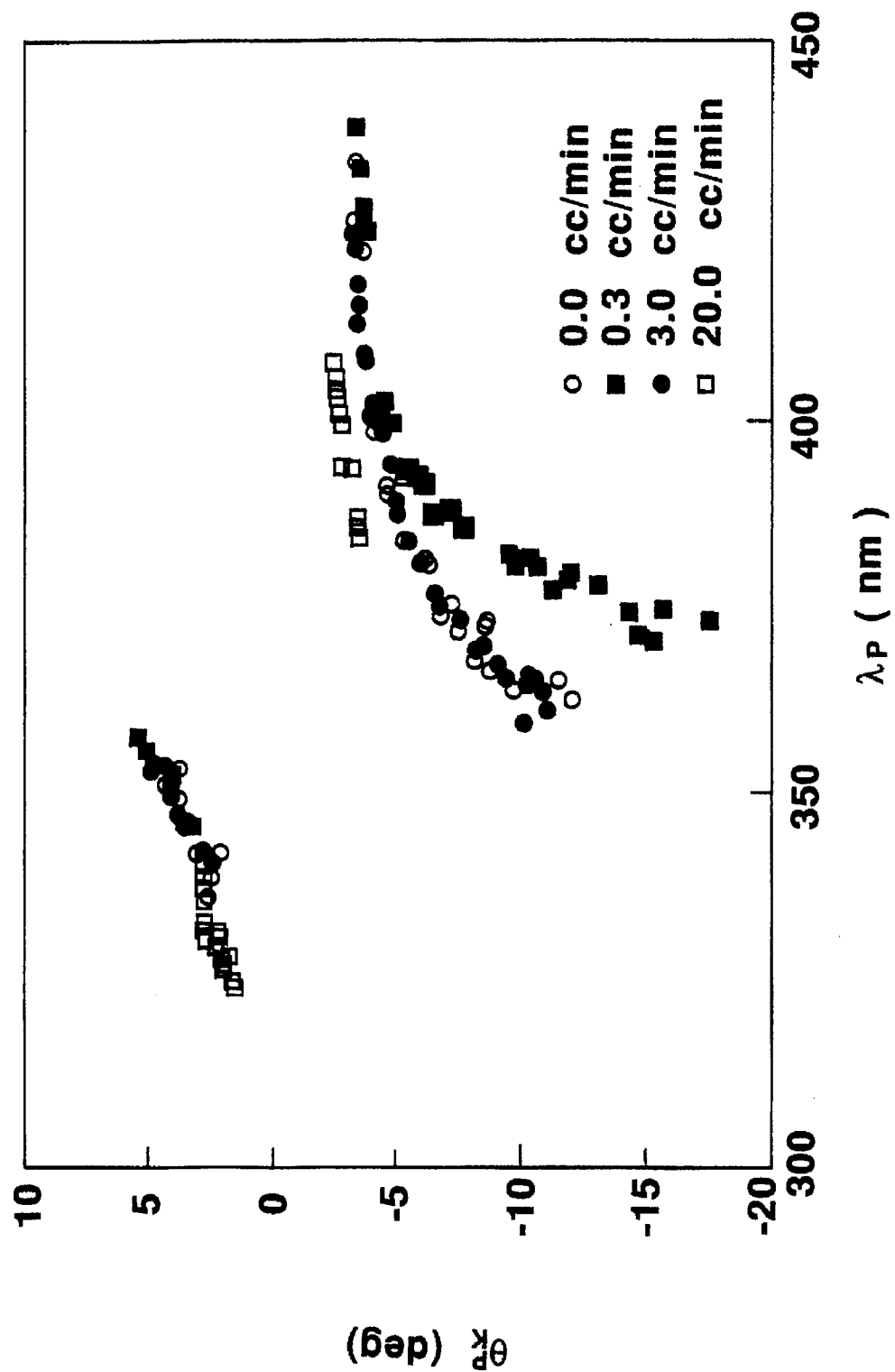

FIG. 12 shows a relationship between the wavelength of radiated light and a maximum value of the Kerr rotation angle in each of samples manufactured at $N_2$ gas flow rates of 0.3 cc/min, 3.0 cc/min, and 20.0 cc/min together with that obtained in samples manufactured at an $N_2$ gas flow rate of 0.0 cc/min shown in FIG. 1. Note that substantially the same Kerr rotation angle was obtained at a wavelength of 400 nm or more regardless of the $N_2$ gas flow rate. Therefore, a wavelength band having a wavelength of 450 nm is omitted from FIG. 12.

As is apparent from FIG. 12, samples manufactured at an $N_2$ flow rate of 3.0 cc/min exhibit substantially the same Kerr rotation angles as in samples manufactured at an $N_2$ gas flow rate of 0.0 cc/min in all wavelength bands. Samples manufactured at an $N_2$ gas flow rate of 0.3 cc/min exhibit Kerr rotation angles larger than those of samples manufactured at an $N_2$ gas flow rate of 0.0 cc/min in a wavelength band of 360 to 400 nm. In this case, the value reaches −17.5° at a wavelength of 373.5 nm.

In these samples, the wavelength band of 360 to 400 nm in which the Kerr rotation angle is abruptly increased corresponds with the wavelength band in which the adsorption coefficient is abruptly increased, as shown in FIGS. 3A to 3D. In the wavelength range of less than 360 nm where the sign of $\theta^p_k$ reverses however the nitrogen in the film produces no effect on the enhancement of $\theta_k$.

As described above, a dielectric thin film manufactured at an $N_2$ gas flow rate of 3.0 cc/min or less exhibits a Kerr rotation angle larger than that obtained by a conventional dielectric thin film in a wavelength band (780 to 830 nm) of a semiconductor laser and exhibits a very large Kerr rotation angle exceeding 10° in a short-wavelength region of 360 to 400 nm. Therefore, this dielectric thin film can be used not only as a Kerr rotation angle enhancing film of a magneto-optical recording medium but also as a Kerr rotation angle enhancing film of a magnetic temperature sensor or a magnetic field sensor using the characteristic of a magnetic thin film in which the Kerr rotation angle changes in accordance with a temperature or the strength of a magnetic field.

A magneto-optical recording medium using the dielectric thin film of the present invention as a Kerr rotation angle enhancing film will be described below.

A simplest structure of the magneto-optical recording medium is essentially the same as the structure shown in FIG. 10. That is, a magnetic thin film 22 is formed as a recording layer on a substrate 21, and a dielectric thin film 23 of the present invention is formed as a Kerr rotation angle enhancing layer on the magnetic thin film 22. The substrate 21 consists of a transparent stable material, e.g., glass or a polymer material such as polycarbonate. The magnetic thin film (recording layer) 22 is preferably made of a rare earth-transition metal amorphous alloy, e.g., a TbFeCo alloy as described above. The magnetic thin film 22 preferably has a suitable film thickness which does not allow transmission of light, i.e., a film thickness of 50 to 200 nm. When an information reproduction laser is a semiconductor laser, a thin film manufactured at an $N_2$ gas flow rate of 3.0 cc/min or less during thin film formation is preferably used as the dielectric thin film (enhancing layer) 23. In this manner, even if the magnetic thin film is made of a rare earth-transition metal amorphous alloy having a Kerr rotation angle of about 0.2° to 0.4°, the Kerr rotation angle can be enhanced to about 2.7°. When the information reproducing laser is a short-wavelength laser having a wavelength of 400 nm or less, the Kerr rotation angle can be enhanced to 10° or more by adjusting the nitrogen concentration and the film thickness of the dielectric thin film.

Figure 13:
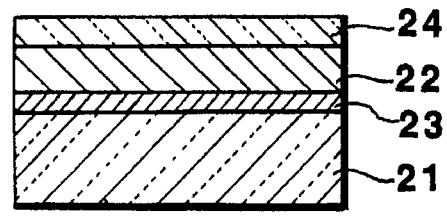
FIGS. 13 to 15 are sectional views each showing a structure of a magneto-optical recording medium.

Note that the structure of the optothermal magnetic recording medium in which the dielectric thin film of the present invention can be used as a Kerr rotation angle enhancing film is not limited to the above structure. For example, as shown in FIG. 13, an enhancing layer 23 consisting of Zn, S, and O or Zn, S, O, and N may be formed on a substrate 21 and a recording layer 22 may be formed thereon. In this case, a laser beam is radiated from the substrate 21 side. In this structure, in order to prolong the life of a medium, a protective layer 24 consisting of, e.g., SiO, $Al_2O_3$, AlN, $Si_3N_4$, $Y_2O_3$, ZnS, ZnSO, or ZnSON may be formed. Note that film formation can be performed more easily by forming the protective layer 24 by the same material as that of the enhancing layer 23, i.e., ZnS, ZnSO, or ZnSON.

Figure 14:
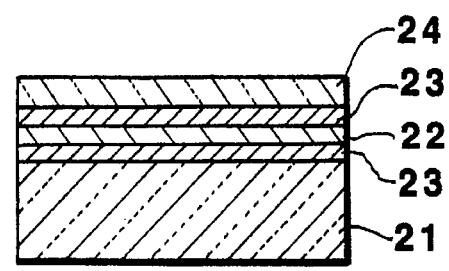

In addition, the magneto-optical recording medium can be arranged as shown in FIG. 14. In this arrangement, a recording layer 22 has a film thickness which allows transmission of light, i.e., a film thickness of 200 to 500 Å is sandwiched by enhancing layers 23. With this arrangement, a Kerr effect and a Faraday effect are superposed to further improve reproduction characteristics. Also in this case, a protective layer 24 is preferably formed as an outermost layer. In this arrangement, a laser beam may be radiated from either the substrate or protective layer side. When a laser beam is radiated from the substrate side, a reflecting function may be imparted to the protective layer 24, or a reflecting layer may be formed inside the protective layer 24. When a laser beam is radiated from the protective layer 24 side, a reflecting function may be imparted to the substrate, or a reflecting layer may be formed inside the substrate 21.

Figure 15:
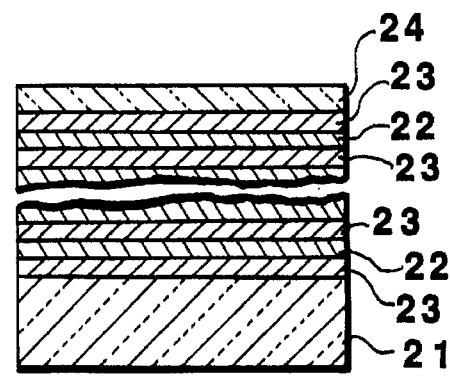

Furthermore, an arrangement as shown in FIG. 15 can be adopted in the present invention. Referring to FIG. 15, a plurality of recording layers 22 and a plurality of enhancing layers 23 are alternately formed on a substrate 21, thereby constituting a magneto-optical recording medium. In this manner, a still stronger Kerr enhancement effect can be obtained. Also in this case, a protective layer 24 is preferably formed on the surface.

Note that although no protective layer is illustrated in the arrangement shown in FIG. 10, the life of a medium can be prolonged by forming the protective layer in the arrangement.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A dielectric thin film consisting essentially of 40 to 60 atomic % of Zn, 30 to 55 atomic % of S and oxygen and nitrogen in amounts defined as follows:

4 atomic % ≦oxygen ≦10 atomic % and 0 atomic % ≦nitrogen ≦7 atomic %.

2. The film according to claim 1, wherein the concentration of N changes in a direction of film thickness of said dielectric thin film.

3. The film according to claim 1, wherein said film is in an amorphous state.

4. The film according to claim 1, wherein said film is in a polycrystalline state.

5. The dielectric film according to claim 1, wherein the amounts of Zn, S, O and N are 46 to 47 atomic % Zn, 42 to 46 atomic % S, 7 to 8 atomic % O and greater than 0 atomic % to 4 atomic % N.

6. A dielectric thin film consisting essentially of 40 to 60 atomic % of Zn, 30 to 55 atomic % of S and oxygen and nitrogen in amounts defined as follows: 7 atomic % ≦oxygen ≦30 atomic % and 5 atomic % ≦nitrogen ≦10 atomic %.

7. The dielectric film according to claim 6, wherein the amounts of Zn, S, O and N are 48 to 52 atomic % Zn, 30 to 35 atomic % S, 7 to 8 atomic % O, and 9 to 10 atomic % N.

8. The film according to claim 6, wherein the concentration of N changes in a direction of film thickness of said dielectric film.

9. The film according to claim 6, wherein said dielectric film is in an amorphous state.

10. The film according to claim 6, wherein said dielectric film is in a polycrystalline state.

11. A dielectric film formed on a magnetic thin film, wherein the dielectric film consists essentially of 7 to 8.0 atomic % oxygen, 5.6 to 9.4 atomic % nitrogen and the remainder being ZnS.

12. The film according to claim 11, wherein said dielectric film is in an amorphous state.

13. The film according to claim 11, wherein said dielectric film is in a polycrystalline state.

14. The film according to claim 11, wherein the atomic % of oxygen is 7.5 to 8.0

15. A dielectric film formed on a transparent substrate with a magnetic thin film being formed on said dielectric film, wherein the dielectric film consists essentially of 7 to 8.0 atomic % oxygen, 5.6 to 9.4 atomic % nitrogen and the remainder being ZnS.

16. The film according to claim 15, wherein said dielectric film is in an amorphous state.

17. The film according to claim 15, wherein said dielectric film is in a polycrystalline state.

18. The film according to claim 15, wherein the atomic % of oxygen is 7.5 to 8.0.

* * * * *